March 18, 1952  H. BRUCKER  2,589,769
MACHINE FOR INSERTING POURING SPOUTS INTO CONTAINERS
Filed Aug. 16, 1946  10 Sheets-Sheet 1

INVENTOR.
HENRY BRUCKER,
BY
ATTORNEY

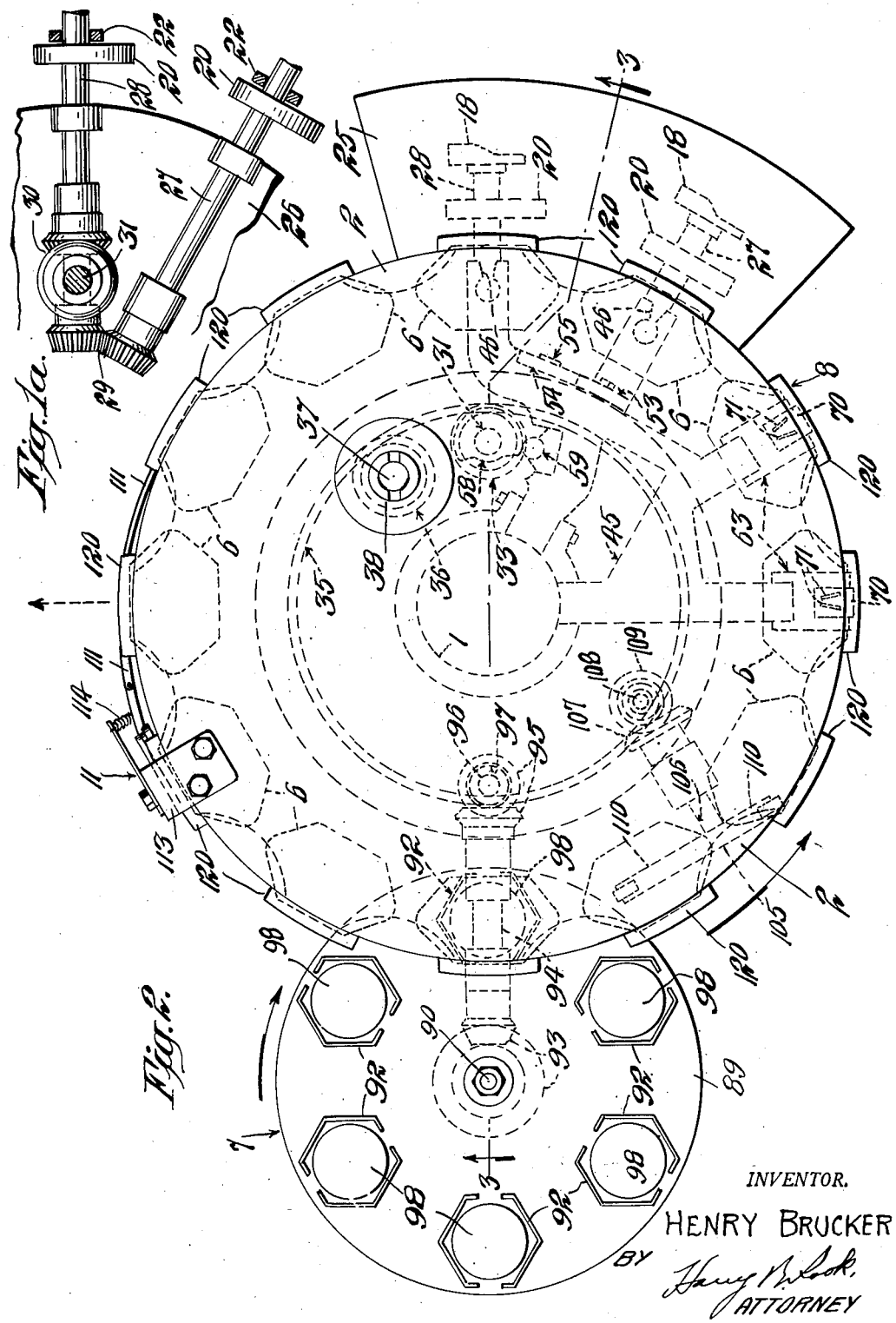

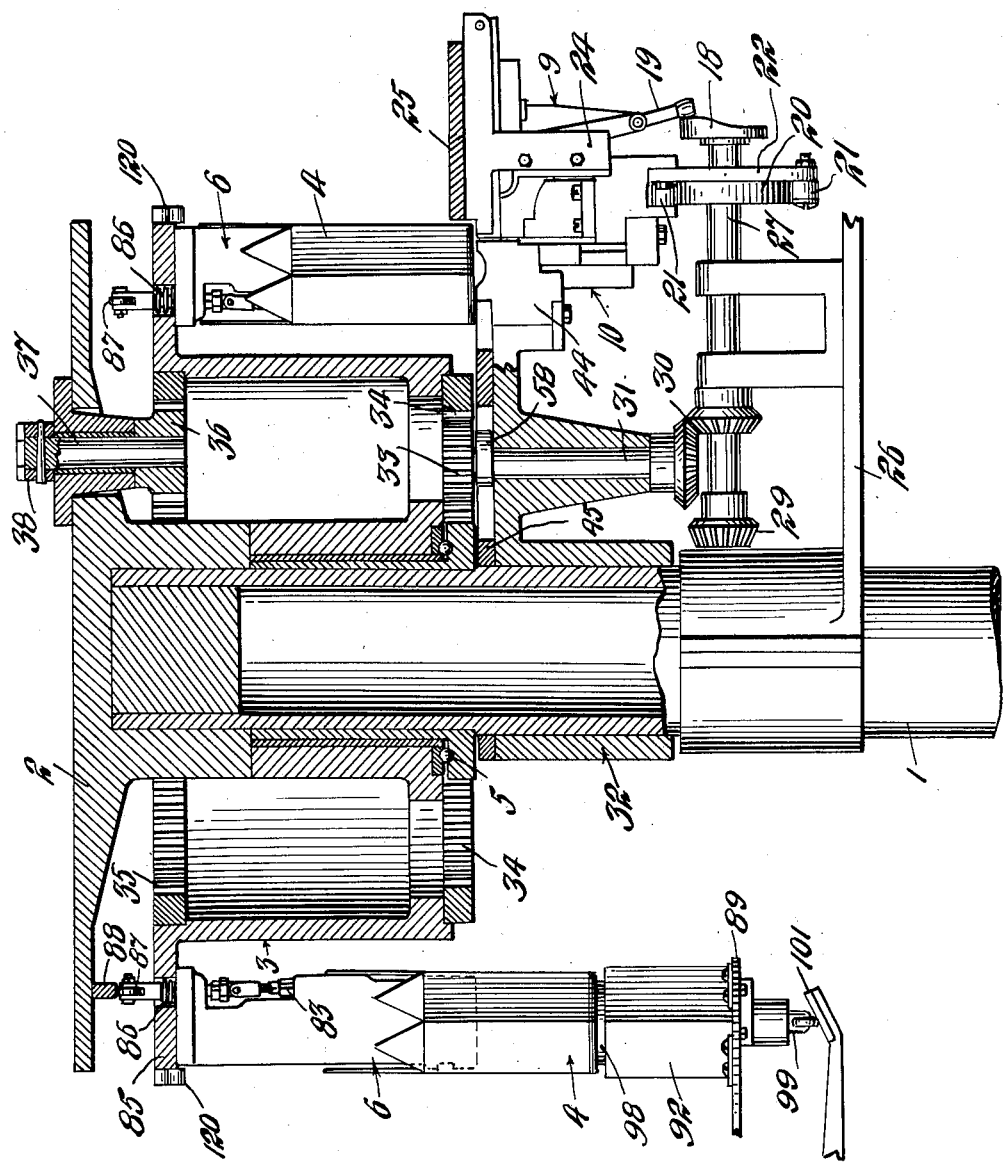

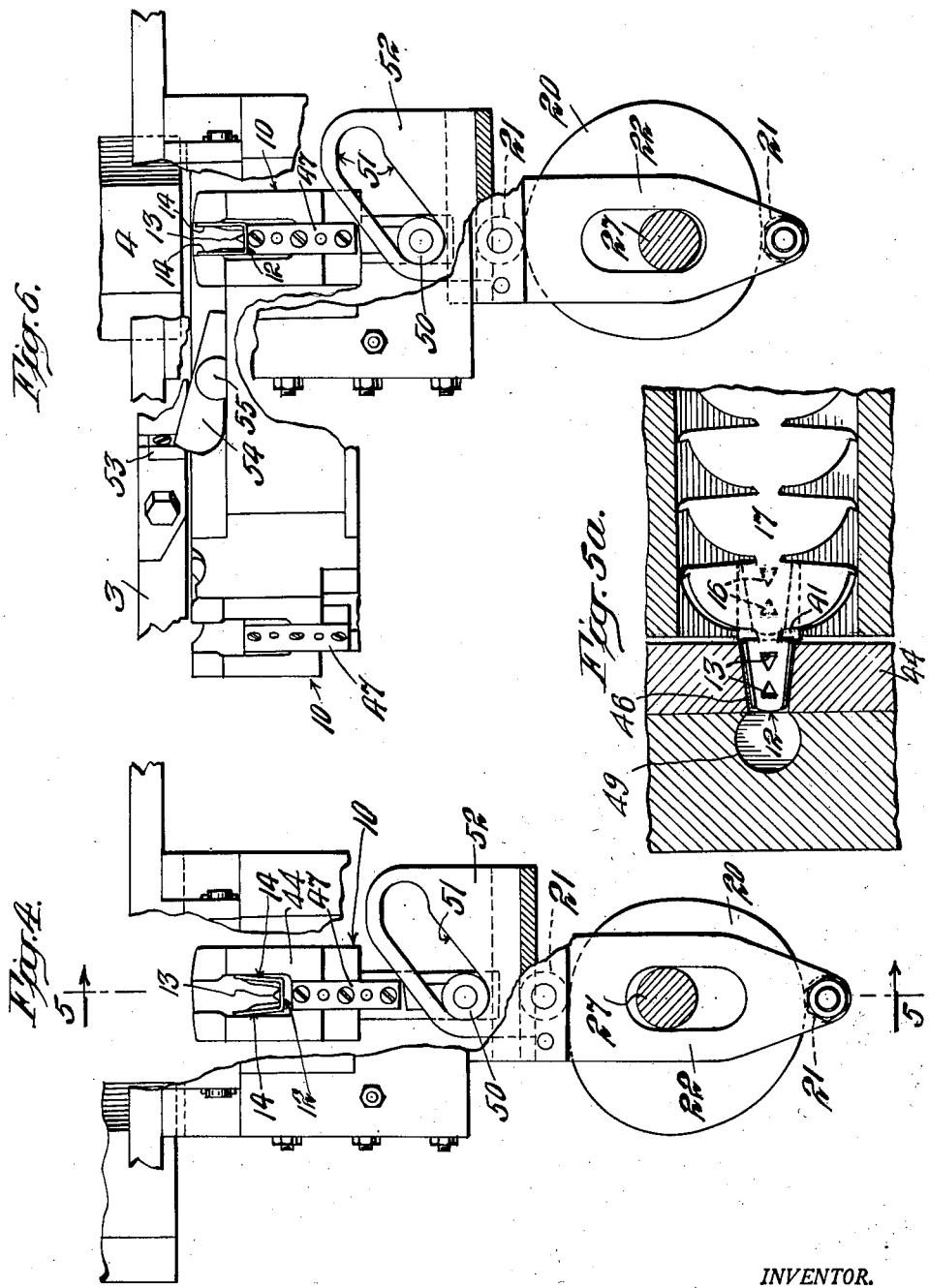

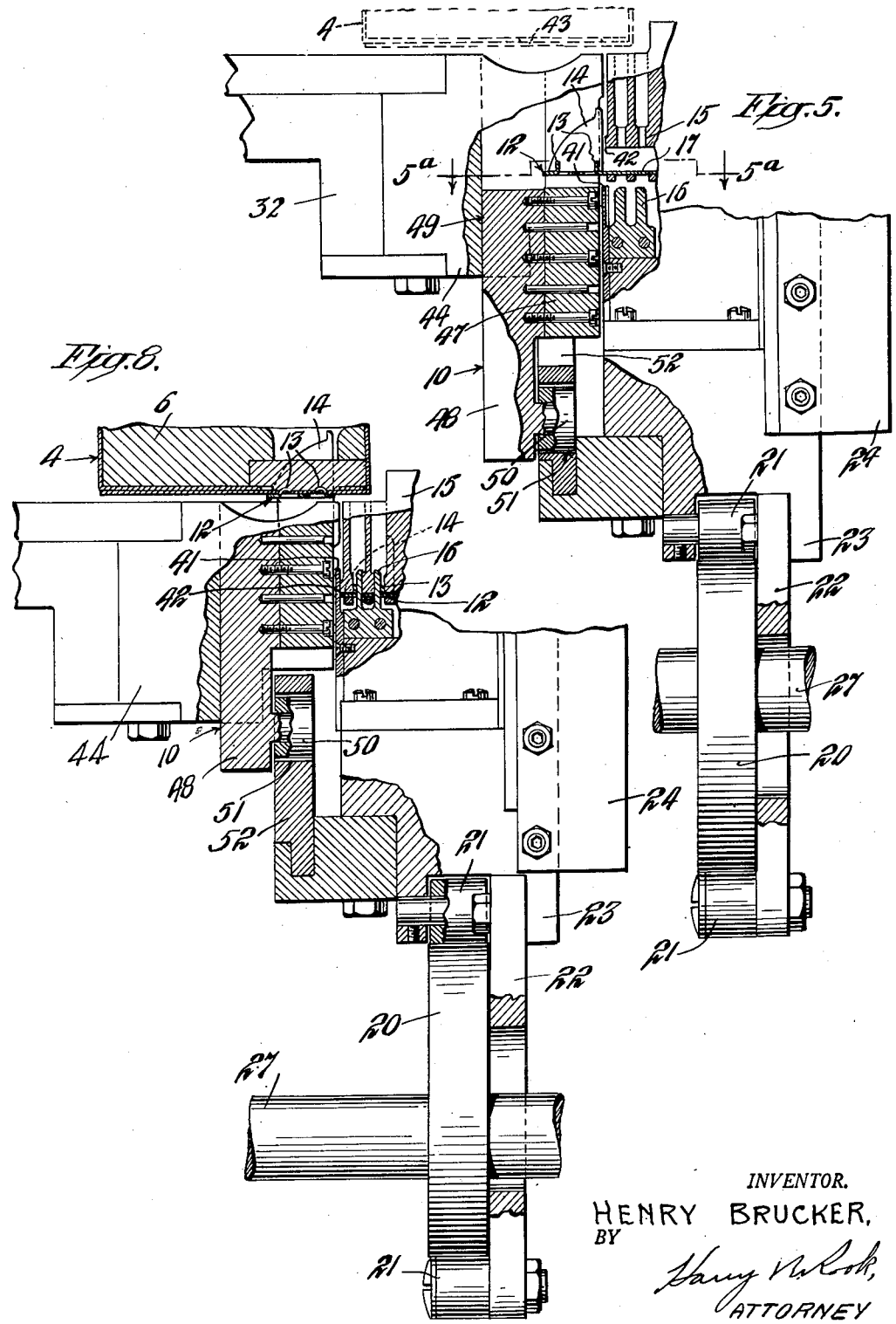

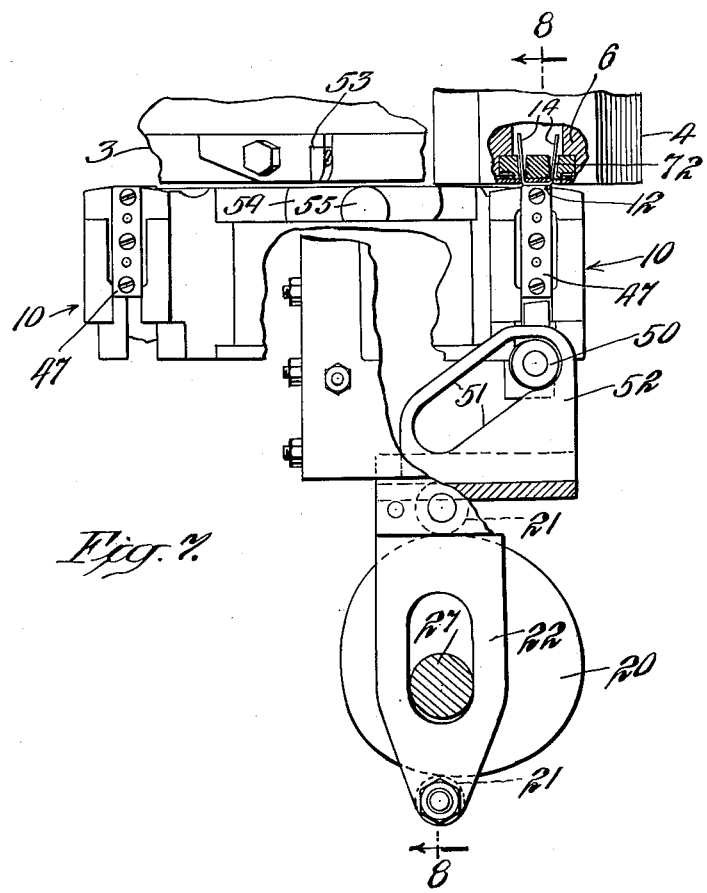

INVENTOR.
HENRY BRUCKER,
BY
*Harry B. Rook,*
ATTORNEY

March 18, 1952   H. BRUCKER   2,589,769
MACHINE FOR INSERTING POURING SPOUTS INTO CONTAINERS
Filed Aug. 16, 1946   10 Sheets—Sheet 8
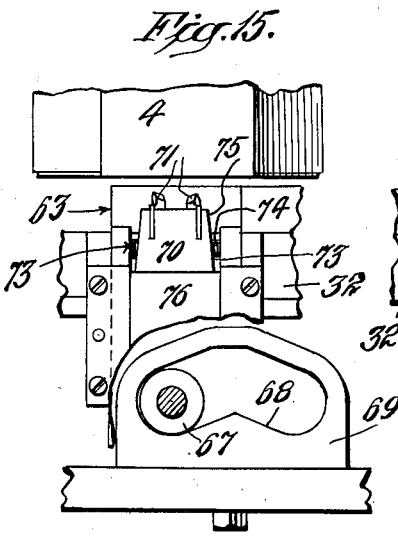
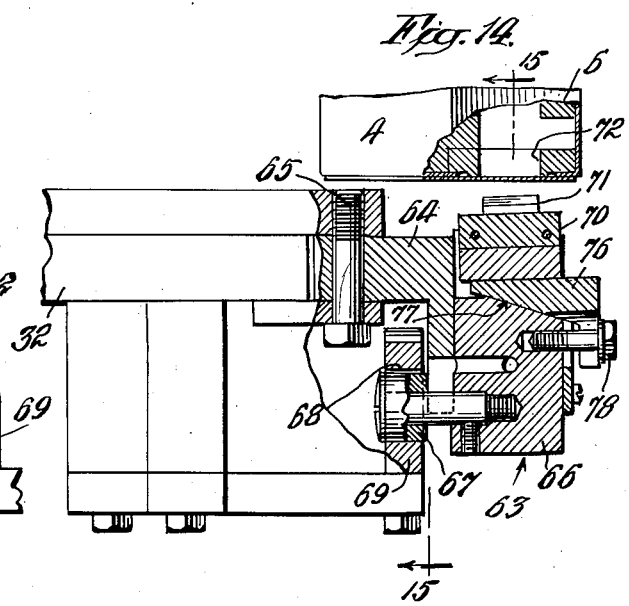
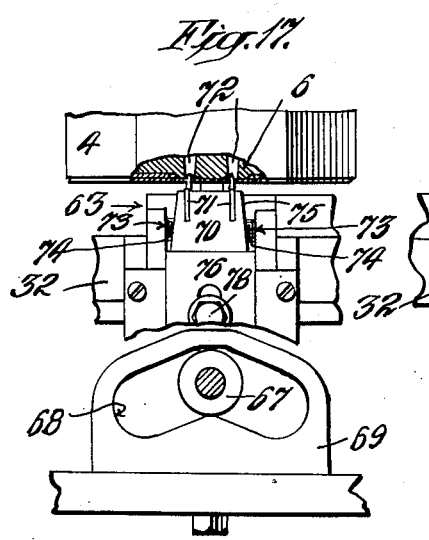
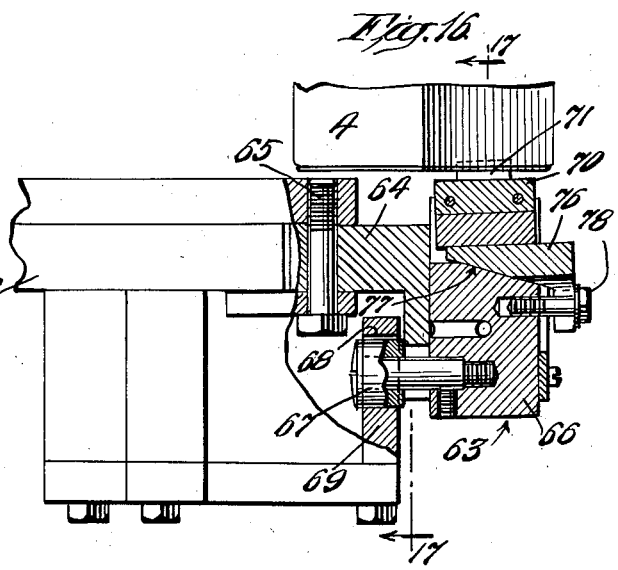
INVENTOR.
HENRY BRUCKER,
BY
*Harry B. Cook,*
ATTORNEY

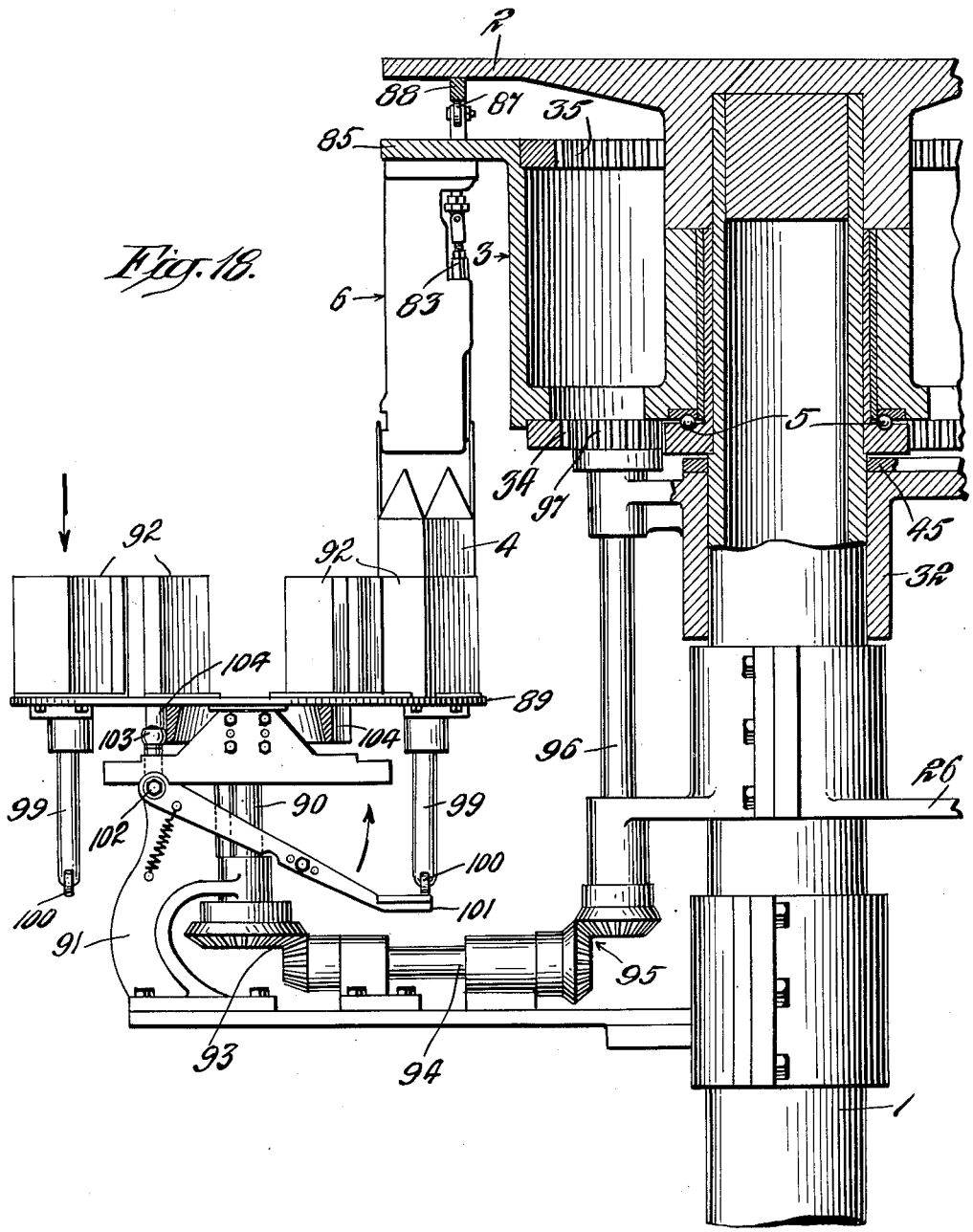

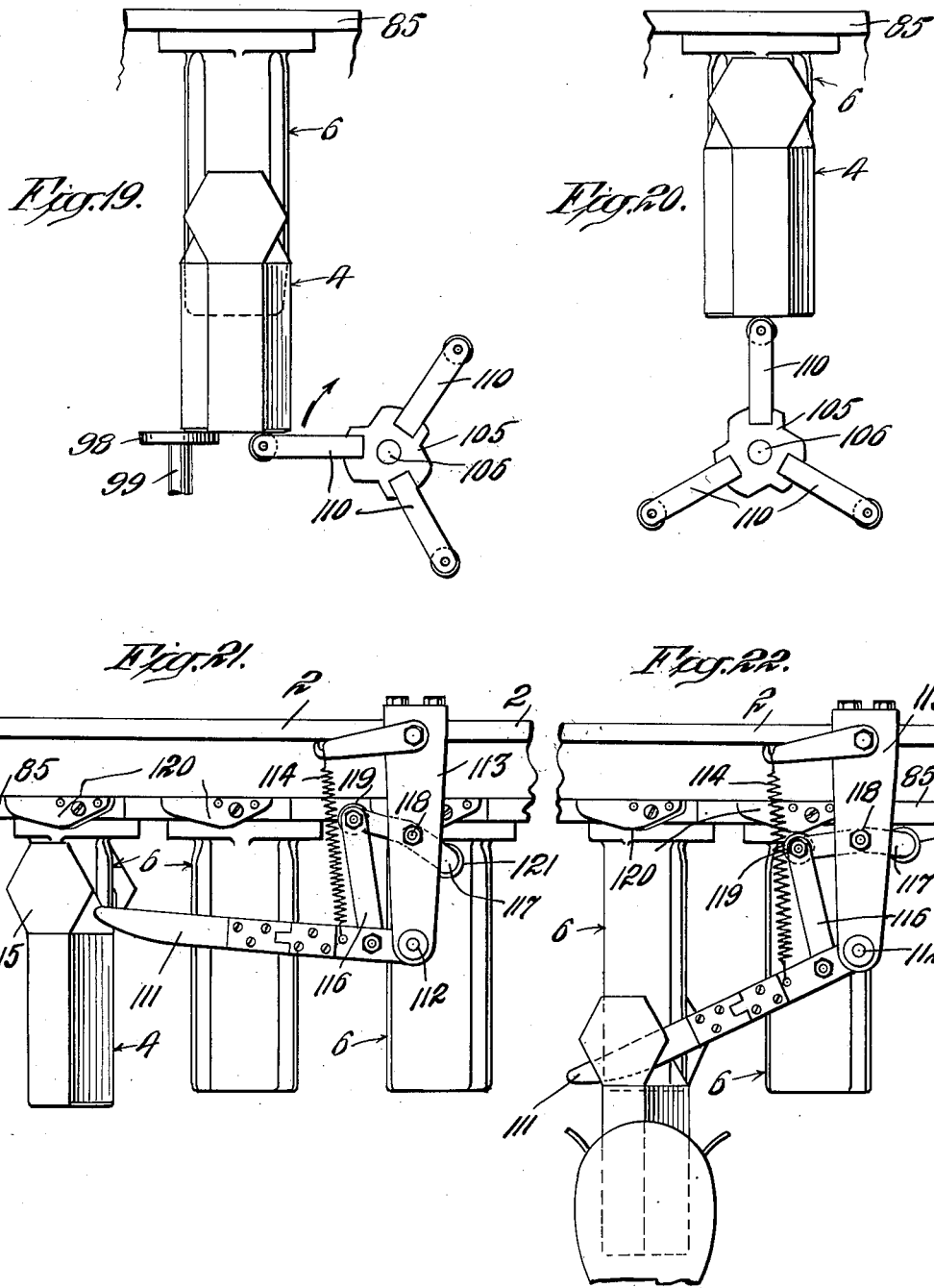

Patented Mar. 18, 1952

2,589,769

UNITED STATES PATENT OFFICE 2,589,769

MACHINE FOR INSERTING POURING SPOUTS INTO CONTAINERS

Henry Brucker, Maplewood, N. J., assignor to Seal-Spout Corporation, Newark, N. J., a corporation of New Jersey Application August 16, 1946, Serial No. 690,901

3 Claims. (Cl. 113—1)

This invention relates to a machine of the general character described and claimed in my U. S. Patent No. 2,216,733, dated October 8, 1940, for inserting pouring spouts into containers.

The combined container and pouring spout includes a box or the like of tearable material, one wall of which may or may not have slits or scores partially outlining a pouring opening, and a pouring spout generally formed of sheet metal or other suitable material and including a body portion overlying the outside of said wall and having sector-shaped wings concentric with one end of the spout inserted through the wall of the container, the body portion of the spout being secured to the wall by prongs stamped from the body portion penetrating the wall and clinched over the inner side thereof.

The machine described in said patent includes a carriage or turret for supporting and moving a plurality of containers, each of which has a portion formed to receive a spout, means for continuously moving said carriage through a predetermined path, spout-forming and feeding mechanism disposed at one side of said path including means for feeding a flat strip of spout blanks step by step, forming means for shaping said blanks into spouts, mechanism juxtaposed to said path for severing spouts from said strip and inserting one into said portion of each of said containers, and means for momentarily moving said mechanism synchronously with said containers and along said path of movement while the spouts are being inserted.

A prime object of the present invention is to provide a novel and improved spout-inserting mechanism which shall comprise a minimum number of simple and relatively inexpensive parts and at the same time shall be reliable and durable in operation.

The machine described in my above-mentioned patent was specifically designed for the insertion of pouring spouts into the side walls of containers, but another object of the present invention is to provide a machine which is specially designed for the insertion of pouring spouts into the bottom or top walls of containers. In other words, the machine of the above-mentioned patent contemplates the movement of the spouts horizontally into the containers, whereas the present machine contemplates vertical movement of the spouts into the containers.

The machine also contemplates at least one and preferably two units for inserting the pouring spouts into the containers, said units being simultaneously oscillatable so that they may move in one direction synchronously with the respective carriers on which the containers are mounted, and another important object of the invention is to provide novel and improved means for mounting and oscillating the spout-inserting units.

A further object of the invention is to provide, in a machine of this character, novel and improved means for slitting or scoring the walls of the containers to condition them for reception of the wings of the pouring spouts.

A still further object of the invention is to provide a novel and improved carrier for supporting and moving the container which shall be so constructed that the container can be easily and quickly applied to and removed therefrom, but at the same time shall firmly hold the container in position during the operation of the machine.

Still further objects of the invention are to provide, in a machine of the general character described, novel and improved means for automatically applying the containers to the respective carriers; and to provide novel and improved means for automatically removing the containers from the carriers after the spouts have been inserted.

Other objects, advantages and results of the invention will be brought out by the following description in conjunction with the accompanying drawings in which:

Figure 1a is a fragmentary horizontal sectional view on the line 1a—1a of Figure 1.

Figure 2 is a schematic top plan view of the machine with portions omitted for clearness in illustration.

Figure 3 is an enlarged fragmentary vertical sectional view taken approximately on the plane of the line 3—3 of Figure 2.

Figure 4 is an enlarged side elevational view of the spout-inserting mechanism viewing the same from approximately the line 4—4 of Figure 1, showing the spout-inserting unit in its normal position at the beginning of the spout-inserting movement.

Figure 5 is an enlarged vertical longitudinal sectional view approximately on the line 5—5 of Figure 1, with portions shown in side elevation.

Figure 5a is a fragmentary horizontal sectional view on the plane of the line 5a—5a of Figure 5.

Figure 6 is a view similar to Figure 4, showing the positions of the parts during the second step of the spout-inserting movement.

Figure 7 is a similar view showing the positions of the parts during the final step of the spout-inserting movement.

Figure 8 is a view similar to Figure 5 taken on the plane of the line 8—8 of Figure 7.

Figure 14 is an enlarged fragmentary vertical longitudinal sectional view approximately on the plane of the line 14—14 of Figure 1, showing one of the container-slitting units in normal inoperative position.

Figure 15 is a vertical sectional view approximately on the plane of the line 15—15 of Figure 14.

Figure 16 is a view similar to Figure 14, showing the unit in container-slitting position.

Figure 17 is a view similar to Figure 15 approximately on the plane of the line 17—17 of Figure 16.

Figure 18 is a side elevational view of the mechanism for partially applying the containers to the carriers, portions being broken away and shown in section.

Figure 19 is a schematic front elevational view of the mechanism for completing the application of the containers to the carriers, showing the parts at the beginning of the container-applying operation.

Figure 20 is a similar view showing the completion of the operation.

Figure 21 is a fragmentary side elevational view of the mechanism for automatically removing the containers from the carriers after the spouts have been inserted, illustrating the parts in their normal positions; and Figure 22 is a similar view showing the parts during the removal of a container from a carrier.

Figure 1:
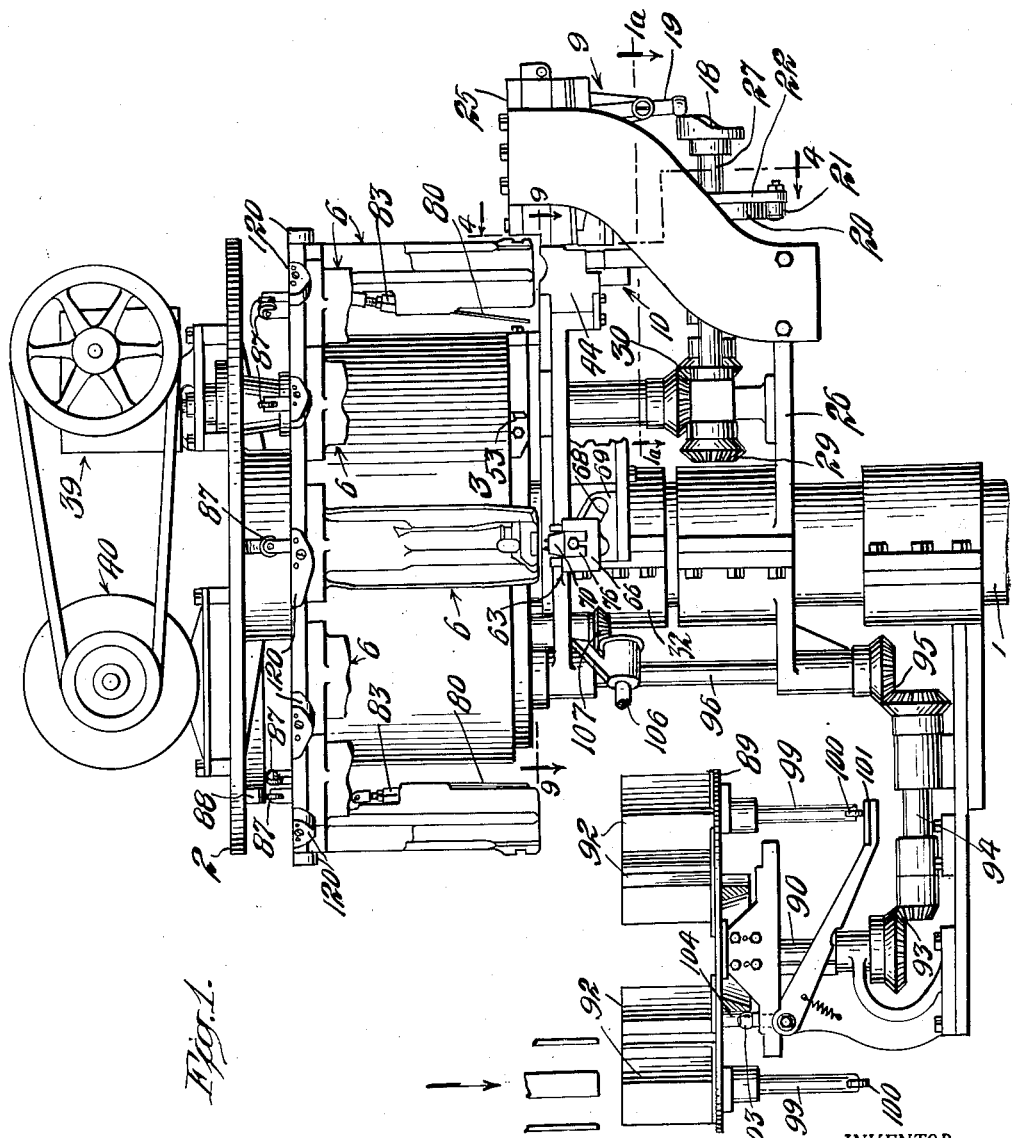
Figure 1 is a side elevational view of the machine embodying my invention, with portions omitted for clearness in illustration.

The machine embodying the invention includes a suitable support which is shown in the form of a pedestal 1 having a base (not shown) and a top plate 2. Supported on the pedestal is a carriage or turret 3 for supporting and moving containers 4 into which pouring spouts are to be inserted, the carriage being shown as rotatable about a vertical axis on a thrust bearing 5 and having an individual carrier 6 for each container which is moved in a predetermined path from a container-inserting or charging station 7, past a mechanism 8 for slitting, scoring or otherwise conditioning the bottom wall of the container to receive a pouring spout, then past a combined spout-blank feeding mechanism and a spout-forming mechanism 9, a spout-inserting mechanism 10 and then to a container-discharging station 11.

While the machine of the present invention may be utilized for inserting different types of spouts or other articles into different forms of containers or other supports, for the purpose of illustrating the principles of the invention the spout herein contemplated comprises a body portion 12, prongs 13 on the body portion to penetrate and be clinched upon a container wall for securing a spout therein, and wings or flanges 14 movable in the pouring opening of the container as the spout is moved from closed to open position.

The present machine is especially designed for use with a spout-blank feeding and spout-forming mechanism of the general type described and claimed in my Patent No. 2,300,099, that mechanism being generally designated 9, as above described, and including a stationary die 15 and a reciprocable die 16 to receive between them a spout-blank strip 17 which is fed between the dies in timed relation to the movement of the reciprocating die 16, step by step, one spout-blank at a time by known feeding mechanism which is operated by a cam 18 that is followed by one end of a lever 19 for reciprocating the spout-feeding mechanism.

The two dies 15 and 16 are so shaped as to bend up the side wings 14 of the spout when the reciprocating die 16 is moved toward the die 15 as shown in Figure 8, and simultaneously, the prongs 13 are formed by punches 15 carried by the die 16. The reciprocation of the die 16 is shown as effected by a cam 20 which is engaged by follower rollers 21 on a plate 22 that is connected to a block 23 that is slidable in a fixed guide 24 which is mounted in any suitable manner on the machine, for example by a bracket 25 that is secured to a frame 26 rigidly mounted on the pedestal 1.

In accordance with the invention, to provide more rapid production, two spout-forming and feeding mechanisms 9 and two spout-inserting units 10 are utilized. The cams 18 and 20 of each spout-feeding and forming mechanism are mounted on shafts 27 and 28 which are geared together by bevel gearing 29 and one of which is driven through bevel gearing 30 from a vertical counter-shaft 31 which is journaled in another frame piece 32 mounted on the pedestal 1 and has a pinion 33 meshing with an internal or ring gear 34 mounted on the lower end of the turret or carriage 3, the upper end of which has rigidly fixed thereon a second internal gear 35 with which meshes a pinion 36 on a drive shaft 37 that is connected by a strap coupling 38 and by a speed-reducing gear 39 that is driven by an electric motor 40 mounted on the top plate 2.

With this construction, the spout-blank strip 17 is fed, step by step, and during each step of movement a spout is completely formed in the dies 15—16, while the next preceding spout is projected into the spout-inserting unit as shown in Figure 5 and is severed from the strip by a movable knife blade 41 on the die 16, which cooperates with an edge 42 on the die 15 when the movable die moves toward the fixed die to form a spout. The completed spout is then moved upwardly by the spout-inserting unit 10 and inserted into the bottom wall 43 of a container 4.

The containers 4 move one after another past the spout-inserting units 10 by rotation of the turret or carriage 3 through the gearing 35—36. As shown there are twelve carriers or mandrels 6 mounted on the turret in equi-distantly spaced relation circumferentially thereof, while there are two spout-inserting units 10 so that spouts are inserted into two containers at the same time, one spout being inserted into each container by each of the spout-inserting units 10. During each spout-inserting operation, the spout-inserting units move synchronously with the respective containers momentarily along the path of movement of the containers.

Each spout-inserting unit includes a spout holder 44 which is mounted on an auxiliary frame 45 that is rotatably mounted on the pedestal 1 to oscillate thereabout. Each spout holder has a spout-receiving channel 46 of a cross-sectional shape corresponding to the shape of the body of the spout and extending vertically transversely of the guideway through which the spout is projected between the dies 15 and 16 so as to receive the completed spout as the latter is severed from the strip 17.

A pusher or ram 47 is slidable in the channel to push the severed and completed spout through the channel and through the slits or scores in the bottom wall 43 of the container. The pusher 47 may be of any suitable construction, but as shown comprises a bar of a cross-section approximately corresponding to the shape of the channel 46 and connected to a guide block 48 that is slidable in a correspondingly shaped opening 49 in the spout holder. The ram 47 is actuated upwardly by a roller 50 carried by the guide block 48 and riding in a cam slot 51 which is mounted in a plate 52 connected to the slide block 23 of the spout-forming mechanism, said roller 50 being caused to ride upwardly in the cam slot 51 (see Figures 4, 6 and 7) when the spout-inserting units are moved synchronously with the containers.

Figure 9:
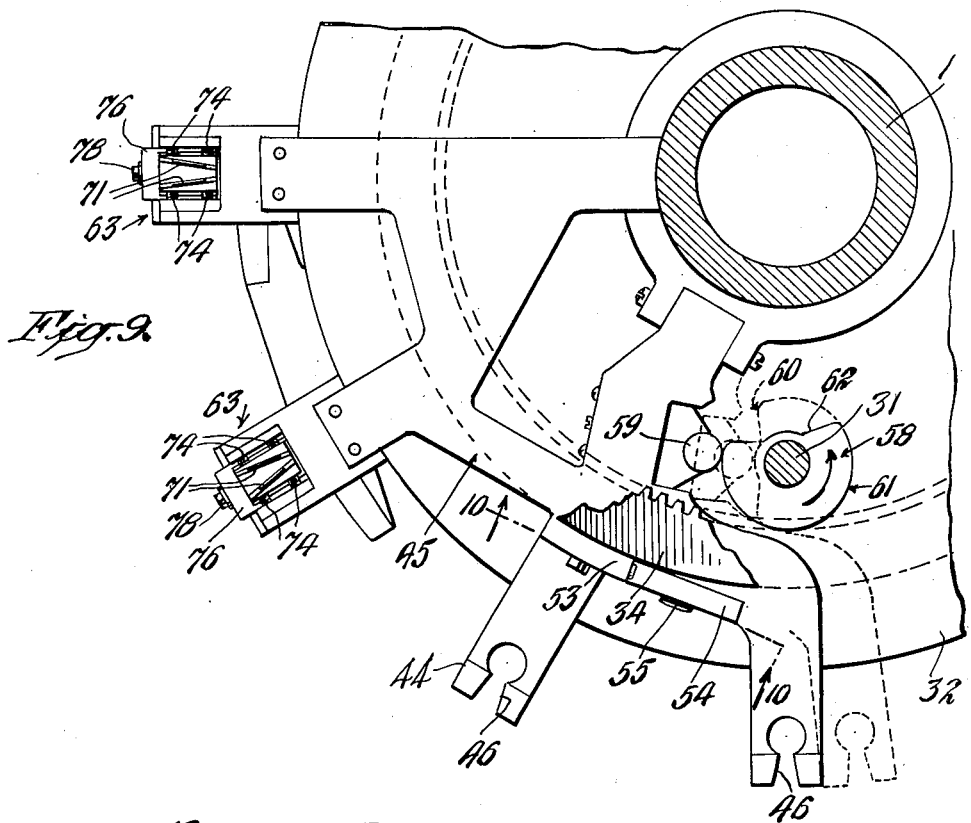
Figure 9 is an enlarged fragmentary horizontal sectional view approximately on the plane of the line 9—9 of Figure 1, with portions omitted for clearness in illustration.
Figure 10:
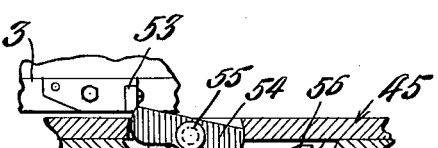
Figure 10 is a fragmentary vertical sectional view on a reduced scale on approximately the plane of the line 10—10 of Figure 9, showing the parts in position for moving the spout-inserting units during the insertion of the spouts.

This synchronous movement of the spout-inserting mechanism with the containers is effected by abutment blocks 53 mounted exteriorly on the lower end of the turret 3 cooperating with pawls 54 which are pivoted intermediate their ends 55 on the auxiliary frame 45. These pawls 54 are normally located as shown in Figures 6, 9 and 10 so that the rear ends thereof will be abutted by the blocks 53 so as to swing the frame 45 and the spout-inserting units with the turret. It will be observed that the abutment blocks and pawls will be so located on the machine that the spout-inserting mechanism will be moved with the turret only when a carrier 6 with a container thereon is properly juxtaposed to and above one of the spout-guiding channels 46, and that the movement of the spout-inserting mechanism with the turret and containers will continue only long enough to permit the rams 47 to push the spouts through the respective channels 48 into the bottom walls of the containers.

Figure 11:
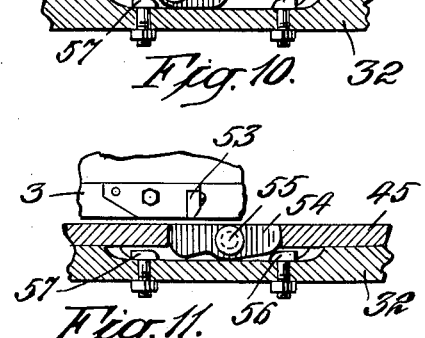
Figure 11 is a similar view showing the parts in the position during the reverse movement of the spout-inserting units.

To interrupt or stop the movement of the spout-inserting mechanism with the turret, a fixed cam 56 is mounted on the frame piece 32 to be engaged by the leading end of the corresponding pawl 54 so as to swing the rear end of the pawl downwardly out of engagement with the abutment block 53 as shown in Figure 11. Upon reverse movement of the spout-inserting mechanism, the rear end of each pawl 54 engages a cam 57 to move the pawl upwardly into position, to be abutted by the next approaching abutment block 53 as shown in Figure 10.

The reversing of the spout-inserting mechanism is effected by a rotating cam 58 which cooperates with a roller or bearing block 59 on the auxiliary frame 45 (see Figures 1 and 9), said cam being mounted on the shaft 31 and being driven in timed relation to the turret 3. This cam has a shoulder 60 followed by a concentric dwell 61 for moving and holding the auxiliary frame 45 in its normal position in proper relation to the spout-forming mechanism, the cam also having a cut-away portion 62 which provides a clearance to permit movement of the auxiliary frame 45 with the turret during the spout-inserting operation.

From the foregoing, it will be understood that the spout-blank strips 17 will be forwarded, step by step, two spouts will be completed in the dies 15 and 16 upon movement of the slide blocks 23 and die 16 by the cams 20 from the positions shown in Figures 4 and 5, to the position shown in Figures 7 and 8, and a completed spout will be severed from the strip and deposited in each spout-receiving channel 46. Then, when a container is in proper juxtaposition above each spout-receiving channel, the spout-inserting mechanism will be moved synchronously with the containers by the blocks 53 and pawls 54; and, simultaneously, the rollers 50 will ride in the cam slots 51 so as to actuate the rams 47 upwardly to insert the spouts through the bottom walls 43 of the respective containers as shown in Figure 8. It will be understood that the prongs 13 will also be forced through the walls of the containers and will be clinched as shown in Figure 8 by engagement with the lower end of the corresponding carrier 6 under the pressure of the ram 47.

While in all cases it is not essential, generally it is desirable to preliminarily score or slit the walls of the containers to facilitate insertion of the wings of the spouts through said walls. For this purpose I have shown two identical slitting units 63 mounted on the auxiliary frame 45 in spaced relation to each other, corresponding to the spacing of the container carriers 6, so that while two spouts are being inserted, one in each of the two containers, slits will be formed in each of two succeeding containers.

As shown, each slitting unit comprises a body portion 64 secured by a bolt 65 on the auxiliary frame 45 and has a slide block 66 vertically slidable therein. This block 66 carries a follower roller 67 which rides a cam slot 68 in a plate 69 that is mounted on the frame piece 32. Mounted on the top of the block 66, is a blade carrier 70 which has two blades 71 so shaped and arranged as to form the desired slits in the container wall in cooperation with slots 72 in the lower end of the corresponding carrier 6 (see Figure 14). The blade carrier 70 is adjustably mounted in a groove 73 in the block 66 by set screws 74 which abuttingly engage upwardly converging side walls 75 on the blade carrier, and the blade carrier is vertically adjustable by a wedge plate 76 which engages a beveled surface 77 on the block 66 and is held in adjusted position by a cap screw 78.

With this construction, assuming it is desired to elevate the blade carrier 70, the set screws 74 will be loosened and the cap screws 78 will be tightened so as to force the beveled sides 75 of the carrier 70 into tight engagement with the screws 74. To adjust the blade carrier horizontally, one screw 74 may be loosened and the other tightened. It will be understood that when the auxiliary frame 45 moves with the turret 3, the rollers 67 will ride in the cam slots 68 so as to first force the blades 71 against the bottom walls of the respective containers, and then permit the blades to withdraw; and the slitting mechanisms are located in advance of the spout-inserting mechanism so that the container walls will be slit or scored prior to their presentation to the spout-inserting mechanism.

Figure 12:
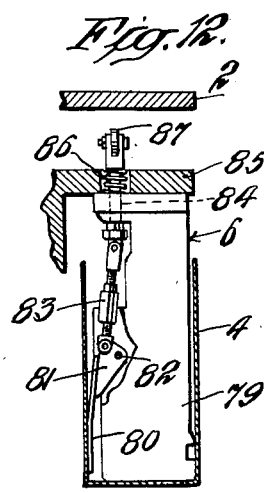
Figure 12 is a detached side elevational view of one of the container carriers with a container mounted thereon and shown in vertical section.
Figure 13:
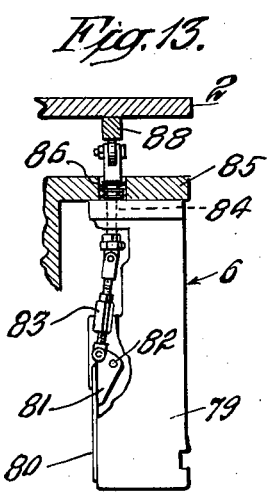
Figure 13 is a similar view showing the carrier with the container holder in container-releasing position.

The preferred form of container carrier comprises a body portion 79 of a cross-sectional shape and length to receive the container to be operated upon, and at one side of the body portion 79 is mounted a container holder which comprises a spring strip 80 secured at one end to a pivot block 81 that is pivotally mounted at 82 on the body portion and is connected by a link 83 to a slide rod 84 which is slidably mounted in a horizontal circumferential flange 85 on the turret, from which the carriers 6 are suspended. The slide rods are normally influenced upwardly by compression springs 86 so as to swing the spring strips 80 into a position to tightly frictionally engage the container slipped over the carrier as shown in Figure 12 and thereby hold the container on the carrier. However, at the container-applying station 7 and the container-removing station 11, this slide rod is pushed downwardly by engagement of a roller 87 with a cam track 88 on the top plate 2 so as to swing the spring strip 80 into the position shown in Figures 13 and 18 so that a container may be easily slipped on or off the carrier.

For automatically applying the containers to the carriers 6, I utilize a horizontal table 89 which is journaled on a vertical shaft 90 in a bearing bracket 91 that is secured to the pedestal 1, said table having a plurality of pockets 92 of a cross-sectional shape approximately corresponding to that of the container being handled, and of sufficient size to permit the containers to be easily dropped into the pockets, either manually or automatically, from a conveyor. The table is rotated by bevel gearing 93 from a counter-shaft 94 which is connected by bevel gearing 95 to a vertical jack-shaft 96 that is geared at 97 to the internal gear 34 at the bottom of the turret. The table is so mounted that the pockets 93 are moved in continuous succession beneath the carriers 6, and as each pocket reaches a point directly in line with a carrier, the container in said pocket is automatically pushed upwardly and slipped over the carrier.

This is effected by a pusherplate 98 carried by a vertical push rod 99 which is slidable in the table 89 approximately co-axially with each pocket 92, the lower end of each push rod 99 having a roller 100 which, when the corresponding pocket is in alignment with a carrier 6, passes over one end of a lever 101 which is pivotally mounted intermediate its ends at 102 on the bracket 91 and has a roller 103 at its other end that follows a cam 104 on the bottom of the table 89. The cam 104 is so shaped that as each push rod 99 arrives over the end of the lever 101, the lever is swung upwardly to push a container upwardly onto the carrier disposed above the corresponding pocket.

The practical extent of movement of the pusher plate 98 is not sufficient to slide the container entirely upon the carrier, and to supplement the action of the pusher plate, I utilize a three-armed lifter 105 which is carried by a horizontal shaft 106 that has a bevel gear connection 107 with a vertical counter-jack-shaft 108 which is geared at 109 to the internal gear 34. The arms 110 are equi-distantly spaced and the lifter is rotated in such timed relation to the movement of the carrier and the pusher plate 98 that as the latter moves from beneath the container, one arm of the lifter engages the bottom wall of the container as shown in Figure 19, and upon further rotation of both the carriage 3 and the lifter, the container is pushed all the way onto the corresponding carrier.

As hereinbefore described, during this application of the container, the container holder 80 is in the position shown in Figure 18, but after the container has been slipped entirely upon the carrier, the holder 80 is released by the cam track 88 so that it may firmly frictionally grip the container to hold it on the carrier.

In accordance with the invention, the containers are also automatically removed from the carriers after the spouts have been inserted, and for this purpose I utilize a mechanism which is illustrated in Figures 21 and 22 and comprises an approximately horizontal arm 111 that is pivotally mounted at one end at 112, on a bracket 113 that is rigidly secured to the top plate 2. This arm is normally influenced upwardly by a spring 114 so that it is disposed above the top edge of the containers on the carriers as shown in Figure 21, and is so located that it will enter between the carrier and the hinged top wall 115 of the container as the container is rotated by the carriage.

When the top edge of the container has moved beneath the arm 111, the latter is swung downwardly into the position shown in Figure 22 so as to forcibly slide the container off the carrier. This action is effected by a link 116 which pivotally connects the arm 111 to one end of a lever 117 which is pivoted intermediate its ends 118 on the bracket 113 and has a roller 119 at said end to cooperate with cam lugs 120 on the upper edge of the turret or carriage 3. There is one lug for each carrier, and as the lug passes over the roller 119, the link 116 is pushed downwardly to swing the lever 117 downwardly and force the container from the carrier. If per chance the spring 114 fails to return the lever 111, the lug will strike another roller 121 at the opposite end of the lever 117 so as to forcibly swing the arm 111 upwardly.

While I have shown and described the invention as embodying certain details of construction, it will be understood that this is primarily for the purpose of illustrating the principles of the invention and that many modifications and changes in the construction of the machine may be made within the spirit and scope of the invention. Furthermore it will be evident to those skilled in the art, that the invention may be utilized for inserting or attaching other parts than pouring spouts into or to other articles than containers, and that other means than the slitting units 63 may be used for performing different operations upon the containers or other articles.

What I claim is:

1. A machine for securing a part in a predetermined portion of an article, comprising a support, a carriage on said support having a carrier thereon for holding and moving the article and movable in a predetermined path, a unit to hold a part, means to move said unit alternately in opposite directions and in one direction momentarily synchronously with said carrier along a portion of said path, and means for attaching said part to an article during said momentary movement of said unit including a device reciprocable in said unit and movable approximately in a straight line in one direction to secure said part in said article, and apparatus to actuate said device in said direction including one mechanism operative while said unit is stationary at the starting point of said momentary movement to actuate said reciprocable device through a portion of its movement in said direction and another mechanism operative during said momentary movement of said unit with said carrier to actuate said reciprocable device through the other portions of its movement in said direction, the first-named mechanism including a rotatable cam on said support, a cam follower block movably guided on said support and connected to a part of said device, and the second-named mechanism including a part on said cam follower block and a part on said device cooperative during said momentary movement of said unit.

2. A machine for securing a part in a predetermined portion of an article, comprising a support, a carriage on said support having a carrier thereon for holding and moving the article and movable in a predetermined path, a unit to hold a part, means to move said unit alternately in opposite directions and in one direction momentarily synchronously with said carrier along a portion of said path, and means for attaching said part to an article during said momentary movement of said unit including a device reciprocable in said unit and movable approximately in a straight line in one direction to secure said part in said article, and apparatus to actuate said device in said direction including one mechanism operative while said unit is stationary at the starting point of said momentary movement to actuate said reciprocable device through a portion of its movement in said direction and another mechanism operative during said momentary movement of said unit with said carrier to actuate said reciprocable device through the other portions of its movement in said direction, the first-named mechanism including a rotatable cam on said support and a cam follower block on said support connected to a part on said device, and the second-named mechanism including a part on said cam follower block having an inclined surface, and a part on said device engageable with said inclined surface during said momentary movement of said unit.

3. A machine for securing a part in a predetermined portion of an article, comprising a support, a carriage on said support having a carrier thereon for holding and moving the article and movable in a predetermined path, a unit to hold a part, means to move said unit alternately in opposite directions and in one direction momentarily synchronously with said carrier along a portion of said path, and means for attaching said part to an article during said momentary movement of said unit including a device reciprocable in said unit and movable approximately in a straight line in one direction to secure said part in said article, and apparatus to actuate said device in said direction including one mechanism operative while said unit is stationary at the starting point of said momentary movement to actuate said reciprocable device through a portion of its movement in said direction and another mechanism operative during said momentary movement of said unit with said carrier to actuate said reciprocable device through the other portions of its movement in said direction, said unit having a channel to receive a part that is disposed at the leading end of a strip of blanks which is projected into said channel in the path of movement of said reciprocable device, the first-named mechanism including a rotatable cam on said support, a follower block on said support connected to a part of said device, and the second-named mechanism including a part on said cam follower block and a part on said device cooperative during said momentary movement of said unit, and with the addition of forming means including cooperative members on said follower block and said support respectively for shaping the blank at the leading end of said strip of blanks into a complete part, and means including cooperative elements on said follower block and said support respectively for severing the completed part from said strip, whereby said forming means, said severing means and said reciprocable device are operated simultaneously by said cam and said follower block.

HENRY BRUCKER.

REFERENCES CITED

The following references are of record in the file of this patent:

UNITED STATES PATENTS

| Number | Name | Date |
| --- | --- | --- |
| 963,603 | Linceford | July 5, 1910 |
| 1,398,018 | Hill | Nov. 22, 1921 |
| 1,935,614 | Conn | Nov. 21, 1933 |
| 1,941,972 | Cameron | Jan. 2, 1934 |
| 1,987,209 | Peyser | Jan. 8, 1935 |
| 2,145,834 | Irven | Jan. 31, 1939 |
| 2,216,733 | Brucker | Oct. 8, 1940 |
| 2,300,099 | Brucker | Oct. 27, 1942 |
| 2,341,131 | Wales | Feb. 8, 1944 |